United States Patent
Cote et al.

(10) Patent No.: US 7,783,474 B2
(45) Date of Patent: Aug. 24, 2010

(54) SYSTEM AND METHOD FOR GENERATING A PHRASE PRONUNCIATION

(75) Inventors: William F. Cote, Carlisle, MA (US); Jill Carrier, Dorchester, MA (US)

(73) Assignee: Nuance Communications, Inc., Burlington, MA (US)

( * ) Notice: Subject to any disclaimer, the term of this patent is extended or adjusted under 35 U.S.C. 154(b) by 818 days.

(21) Appl. No.: 11/069,203

(22) Filed: Feb. 28, 2005

(65) Prior Publication Data

US 2005/0192793 A1  Sep. 1, 2005

Related U.S. Application Data

(60) Provisional application No. 60/547,801, filed on Feb. 27, 2004.

(51) Int. Cl.
G06F 17/27 (2006.01)
G06F 17/21 (2006.01)

(52) U.S. Cl. ............................................. 704/9; 704/10
(58) Field of Classification Search .................... 704/9, 704/10, 258, 260
See application file for complete search history.

(56) References Cited

U.S. PATENT DOCUMENTS

| | | | |
|---|---|---|---|
| 4,477,698 A | 10/1984 | Szlam et al. | |
| 4,965,763 A | 10/1990 | Zamora | |
| 5,253,164 A | 10/1993 | Holloway et al. | |
| 5,325,293 A | 6/1994 | Dorne | |
| 5,327,341 A | 7/1994 | Whalen et al. | |
| 5,392,209 A | 2/1995 | Eason et al. | |
| 5,544,360 A | 8/1996 | Lewak et al. | 707/1 |
| 5,664,109 A | 9/1997 | Johnson et al. | 705/2 |
| 5,787,231 A * | 7/1998 | Johnson et al. | 704/260 |
| 5,799,268 A | 8/1998 | Boguraev | 704/9 |
| 5,809,476 A | 9/1998 | Ryan | |
| 5,832,450 A | 11/1998 | Myers et al. | 705/3 |
| 5,930,754 A * | 7/1999 | Karaali et al. | 704/259 |
| 5,930,756 A * | 7/1999 | Mackie et al. | 704/260 |
| 5,970,463 A | 10/1999 | Cave et al. | |
| 6,014,663 A | 1/2000 | Rivette et al. | 707/4 |
| 6,021,202 A | 2/2000 | Anderson et al. | |
| 6,029,132 A * | 2/2000 | Kuhn et al. | 704/260 |
| 6,032,164 A * | 2/2000 | Tsai | 715/533 |
| 6,052,693 A | 4/2000 | Smith et al. | 707/104.1 |
| 6,055,494 A | 4/2000 | Friedman | 704/9 |
| 6,076,060 A * | 6/2000 | Lin et al. | 704/260 |

(Continued)

OTHER PUBLICATIONS

F. Song et al., A Graphical Interface to a Semantic Medical Information System, *Journal of Foundations of Computing and Decision Sciences*, 22(2), 1997.

(Continued)

*Primary Examiner*—Richemond Dorvil
*Assistant Examiner*—Douglas C Godbold
(74) *Attorney, Agent, or Firm*—Wolf, Greenfield & Sacks, P.C.

(57) ABSTRACT

A system and method for a speech recognition technology that allows language models to be customized through the addition of special pronunciations for components of phrases, which are added to the factory language models during customization. It allows components of a phrase to have different pronunciations inside customer-added phrases than are specified for those isolated components in the factory language models.

18 Claims, 2 Drawing Sheets

U.S. PATENT DOCUMENTS

| | | | | |
|---|---|---|---|---|
| 6,078,885 | A | * | 6/2000 | Beutnagel .................... 704/258 |
| 6,088,437 | A | | 7/2000 | Amick |
| 6,088,666 | A | * | 7/2000 | Chang et al. .................... 704/1 |
| 6,098,042 | A | * | 8/2000 | Huynh ........................ 704/260 |
| 6,134,528 | A | * | 10/2000 | Miller et al. ................ 704/258 |
| 6,178,397 | B1 | * | 1/2001 | Fredenburg ..................... 704/1 |
| 6,182,029 | B1 | | 1/2001 | Friedman ....................... 704/9 |
| 6,192,112 | B1 | | 2/2001 | Rapaport et al. |
| 6,292,771 | B1 | | 9/2001 | Haug et al. |
| 6,347,329 | B1 | | 2/2002 | Evans |
| 6,405,165 | B1 | | 6/2002 | Blum et al. |
| 6,411,932 | B1 | * | 6/2002 | Molnar et al. ............... 704/260 |
| 6,434,547 | B1 | | 8/2002 | Mishelevich et al. |
| 6,438,533 | B1 | | 8/2002 | Spackman et al. |
| 6,553,385 | B2 | | 4/2003 | Johnson et al. .......... 707/104.1 |
| 6,871,178 | B2 | * | 3/2005 | Case et al. .................. 704/260 |
| 6,915,254 | B1 | | 7/2005 | Heinze et al. ................... 704/9 |
| 6,947,936 | B1 | | 9/2005 | Suermondt et al. ............. 707/7 |
| 6,961,695 | B2 | * | 11/2005 | Lawrence ..................... 704/10 |
| 6,973,427 | B2 | * | 12/2005 | Hwang et al. ............... 704/249 |
| 6,990,450 | B2 | * | 1/2006 | Case et al. .................. 704/260 |
| 7,099,828 | B2 | * | 8/2006 | Kobal et al. ................. 704/270 |
| 7,124,144 | B2 | | 10/2006 | Christianson et al. ....... 707/102 |
| 7,165,030 | B2 | * | 1/2007 | Yi et al. ...................... 704/238 |
| 7,165,032 | B2 | * | 1/2007 | Bellegarda .................. 704/258 |
| 7,181,388 | B2 | * | 2/2007 | Tian ............................. 704/10 |
| 7,191,131 | B1 | * | 3/2007 | Nagao ........................ 704/258 |
| 7,249,020 | B2 | * | 7/2007 | Kondo ........................ 704/258 |
| 2002/0007285 | A1 | | 1/2002 | Rappaport ..................... 705/2 |
| 2002/0095313 | A1 | | 7/2002 | Haq ............................. 705/2 |
| 2002/0143824 | A1 | | 10/2002 | Lee et al. ..................... 707/523 |
| 2002/0169764 | A1 | | 11/2002 | Kincaid et al. ................. 707/3 |
| 2003/0046264 | A1 | | 3/2003 | Kauffman ...................... 707/1 |
| 2003/0061201 | A1 | | 3/2003 | Grefenstette et al. ........... 707/3 |
| 2003/0115080 | A1 | | 6/2003 | Kasravi et al. ................. 705/1 |
| 2003/0144842 | A1 | * | 7/2003 | Addison et al. ............. 704/260 |
| 2003/0208382 | A1 | | 11/2003 | Westfall ........................ 705/3 |
| 2003/0233345 | A1 | | 12/2003 | Perisic et al. ................... 707/3 |
| 2004/0054535 | A1 | * | 3/2004 | Mackie et al. .............. 704/260 |
| 2004/0103075 | A1 | | 5/2004 | Kim et al. ....................... 707/1 |
| 2004/0139400 | A1 | | 7/2004 | Allam et al. ................ 715/526 |
| 2004/0186746 | A1 | | 9/2004 | Angst et al. ..................... 705/3 |
| 2004/0220895 | A1 | | 11/2004 | Carus et al. |
| 2004/0243545 | A1 | | 12/2004 | Boone et al. |
| 2004/0243551 | A1 | | 12/2004 | Boone et al. |
| 2004/0243552 | A1 | | 12/2004 | Titemore et al. |
| 2004/0243614 | A1 | | 12/2004 | Boone et al. |
| 2005/0060156 | A1 | * | 3/2005 | Corrigan et al. .......... 704/270.1 |
| 2005/0108010 | A1 | | 5/2005 | Frankel et al. |
| 2005/0114122 | A1 | | 5/2005 | Uhrbach et al. |
| 2005/0120020 | A1 | | 6/2005 | Carus et al. |
| 2005/0120300 | A1 | | 6/2005 | Schwager et al. |
| 2005/0144184 | A1 | | 6/2005 | Carus et al. |
| 2005/0165602 | A1 | * | 7/2005 | Cote et al. ...................... 704/9 |

OTHER PUBLICATIONS

F. Song et al., A Cognitive Model for the Implementation of Medical Problem Lists, *Proceedings of the First Congress on Computational Medicine, Public Health and Biotechnology*, Austin, Texas, 1994.

F. Song et al., A Graphical Interface to a Semantic Medical Information System, *Karp-95 Proceedings of the Second International Symposium on Knowledge Acquisition*, Representation and Processing, pp. 107-109, Nov. 1994.

*Epic Web Training Manual*, pp. 1-33, 2002, May 2002.

B. Hieb, Research Note, NLP Basics for Healthcare, Aug. 16, 2002.

C. Shalizi et al., Pattern Discovery in Time Series, Part I: Theory, Algorithm, Analysis, and Convergence, *Journal of Machine Leaning Research* ? (2002).

C. Nevill-Manning et al., The Development of Holte's 1R Classifier, Department of Computer Science, Proc. Anne '95, pp. 239-242, 1995.

D. Cutting et al., A Practical Part-of-Speech Tagger, Xerox Palo Alto Research Center, 1992.

J. Zavrel et al., Recent Advances in Memory-Based Part-of-Speech Tagging, ILK/Computational Linguistics, 1999.

E. Brill, Some Advances in Transformation-Based Part of Speech Tagging, Spoken Language Systems Group,1994, In Proc. of the 12th N'tnl Conf.on Artificial intelligence, (vol. 1).

J. Nivre, DAC723: Language Technology Finite State Morphology Vaxio University of Mathematics and Systems Engineering, p. 1/11, 2004.

M. Creutz, Morphology and Finite-State Transducers, Oct. 31, 2001, Chap 3, Jurafsky & Martin, Oct. 2001.

http://www.comp.lancs.ac.uk/computing/research/stemming/general/index.htm printed Jul. 19, 2004, Dec. 2001.

http://www.comp.lancs.ac.uk/computing/research/stemming/general/stemmingerrors.htm printed Jul. 19, 2004, Dec. 2001.

http://www.comp.lancs.ac.uk/computing/research/stemming/general/performance.htm printed, Jul. 19, 2004, Dec. 2001.

M. Lee et al., Cleansing Data for Mining and Warehousing, Lecture Notes in Computer Science vol. 1677 archive, *Proceedings of the 10th International Conference on Database and Expert Systems Applications*, pp. 751-760, Springer-Verlag, London, 1999.

C. Van Rijsbergen, *Information Retrieval*, $2^{nd}$ Ed., Ch. 5, Butterworths, London, 1979.

J. Day, Extracting Knowledge from Text Using Learning by Constraint Relaxation (LCR), CSI, www.csi-inc.com/CSI/pdf/jday_icim02.pdf, 2002.

W. Gale et al., Discrimination Decisions for 100,000-Dimensional Spaces, *Current Issues in Computational Linguistics*, pp. 429-450, Kluwer Academic Publishers, 1994.

W. Daelemans et al., TiMBL: Tilburg Memory Based Learner, version 5.0, Reference Guide, ILK *Research Group Technical Report Series* No. 04-02 (ILK-0402), ILK Research Group, Tilburg University, Tilburg, Netherlands, 2004.

Case Study: Massachusetts Medical Society http://www.microsoft.com/resources/casestudies/CaseStudy.asp?CaseStud,ID=14931, Jan. 13, 2004.

W. Braithwaite, Continuity of Care Record (CCR) http://www.hl7.org/library/himss/2004Orlando/ContinuityofCare.pdf, 2004.

C. Waegemann, EHR vs. CCR: What is the difference between the electronic health record and the continuity of care record?, Medical Records Institute, 2004.

Press Release: Kryptiq Announces Support of CCR Initiative and Introduces New Solutions that Enable Information Portability, Accessibility and Clinical System Interoperability, http://www.kryptiq.com/News/PressReleases/27.html, Feb. 17, 2004.

Work Item Summary: WK4363 Standard Specification for the Continuity of Care Record (CCR), http://www.astm.org/cgi-bin/SoftCart.exe/DATABASE.CART/WORKITEMS/WK4363.htm?E+mystore Mar. 3, 2004.

Continuity of Care Record (CCR): The Concept Paper of the CCR, v. 2.1b, http://www.bhtinfo.com/CCR.Concept%20Paper.1.5.doc, 2003.

Continuity of Care Record, American Academy of Family Physicians, http://www.aafp.org/x24962.xml?printxml Nov. 12, 2003.

Continuity of Care Record (CCR), AAFP Center for Health Information Technology, http://www.centerforhitor.org/x201.xml Aug. 20, 2004, Feb. 2003.

Core Measures web page, Joint Commission on Accreditation of Healthcare Organizations, http://www.jcaho.org/pms/core+measures/ printed Mar. 22, 2004, Feb. 2003.

*Specifications Manual for National Implementation of Hospital Core Measures*, v. 2.0, Joint Commission on Accreditation of Healthcare Organizations, http://www.jcaho.org/pms/core+measures/information+on+final+specifications.htm, Feb. 2003.

Code Information and Education web page, American Medical Association, http://www.ama-assn.org/ama/pub/category/3884.html printed Mar. 22, 2004, Feb. 2003.

Category III CPT Codes, American Medical Association, http://www.ama-assn.org/ama/pub/article/3885-4897.html printed Mar. 22, 2004, Jul. 2001.

ICD-9-CM Preface (FY04), http://ftp.cdc.gov/pub/Health_Statistics/NCHS/Publications/ICD9-CM/2004/Prefac05.RTF, 2004.

*ICD-9-CM Official Guidelines for Coding and Reporting*, Oct. 1, 2003.

Q. X. Yang et al., "Faster algorithm of string comparison," *Pattern Analysis and Applications*, vol. 6, No. 1, Apr. 2003: pp. 122-133.

"Hardware Reference Manual," Release 3 for DOS, revised Jan. 1994, Pika Technologies, Inc., Ontario, Canada, available at http://www.pikatechnologies.com/downloads/lecacy/AVA%20B-Series%20Hardware%20Manual.pdf (last accessed Jul. 25, 2005), Jul. 1989.

"Customizing D/41 Call Analysis," date unknown, Intel Corp., Santa Clara, California, available at http://resource.intel.com/telecom/support/appnotes/custd41d.htm (last accessed Jul. 25, 2005).

U.S. Appl. No. 11/068,493, Carus, et al., Sep. 1, 2005.
U.S. Appl. No. 10/953,471, Cote, et al., Jul. 27, 2005.
U.S. Appl. No. 11/007,626, Cote, et al., Jul. 28, 2005.
U.S. Appl. No. 10/840,428, Carus, et al., Oct. 13, 2005.
U.S. Appl. No. 10/951,281, Cote, et al., Sep. 22, 2005.

* cited by examiner

SYSTEM AND METHOD FOR GENERATING A PHRASE PRONUNCIATION

CROSS-REFERENCE TO RELATED APPLICATIONS

This application claims the benefit of priority of U.S. Provisional Patent Application No. 60/547,801, entitled "SYSTEM AND METHOD FOR GENERATING A PHRASE PRONUNCIATION," filed Feb. 27, 2004, which is hereby incorporated by reference in its entirety.

This application relates to co-pending U.S. patent application Ser. No. 10/447,290, entitled "SYSTEM AND METHODS UTILIZING NATURAL LANGUAGE PATIENT RECORDS," filed on May 29, 2003; co-pending U.S. patent application Ser. No. 10/413,405, entitled "SYSTEMS AND METHODS FOR CODING INFORMATION," filed Apr. 15, 2003; co-pending U.S. patent application Ser. No. 11/068,493, entitled "A SYSTEM AND METHOD FOR NORMALIZATION OF A STRING OF WORDS," filed on Feb. 28, 2005; co-pending U.S. patent application Ser. No. 10/448,320, entitled "METHOD, SYSTEM, AND APPARATUS FOR DATA REUSE," filed on May 30, 2003; co-pending U.S. patent application Ser. No. 10/787,889, entitled "SYSTEM, METHOD AND APPARATUS FOR PREDICTION USING MINIMAL AFFIX PATTERNS," filed on Feb. 27, 2004; co-pending U.S. patent application Ser. No. 10/448,317, entitled "METHOD, SYSTEM, AND APPARATUS FOR VALIDATION," filed on May 30, 2003; co-pending U.S. patent application Ser. No. 10/448,325, entitled "METHOD, SYSTEM, AND APPARATUS FOR VIEWING DATA," filed on May 30, 2003; co-pending U.S. patent application Ser. No. 10/953,448, entitled "SYSTEM AND METHOD FOR DOCUMENT SECTION SEGMENTATIONS," filed on Sep. 30, 2004; co-pending U.S. patent application Ser. No. 10/953,471, entitled "SYSTEM AND METHOD FOR MODIFYING A LANGUAGE MODEL AND POST-PROCESSOR INFORMATION," filed on Sep. 29, 2004; co-pending U.S. patent application Ser. No. 10/951,291, entitled "SYSTEM AND METHOD FOR CUSTOMIZING SPEECH RECOGNITION INPUT AND OUTPUT," filed on Sep. 27, 2004; co-pending U.S. patent application Ser. No. 10/953,474, entitled "SYSTEM AND METHOD FOR POST PROCESSING SPEECH RECOGNITION OUTPUT," filed on Sep. 29, 2004; co-pending U.S. patent application Ser. No. 10/951,281, entitled "METHOD, SYSTEM AND APPARATUS FOR REPAIRING AUDIO RECORDINGS," filed on Sep. 27, 2004; co-pending U.S. patent application Ser. No. 11/007,626, entitled "SYSTEM AND METHOD FOR ACCENTED MODIFICATION OF A LANGUAGE MODEL," filed on Dec. 7, 2004; co-pending U.S. patent application Ser. No. 10/948,625, entitled "METHOD, SYSTEM, AND APPARATUS FOR ASSEMBLY, TRANSPORT AND DISPLAY OF CLINICAL DATA," filed on Sep. 23, 2004; and co-pending U.S. patent application Ser. No. 10/840,428, entitled "CATEGORIZATION OF INFORMATION USING NATURAL LANGUAGE PROCESSING AND PREDEFINED TEMPLATES," filed on Sep. 23, 2004, all of which are hereby incorporated by reference in their entirety.

BACKGROUND OF THE INVENTION

The present invention relates generally to a system and method for producing an optimal language model for performing speech recognition.

Today's speech recognition technology enables a computer to transcribe spoken words into computer recognized text equivalents. Speech recognition is the process of converting an acoustic signal, captured by a transducive element, such as a microphone or a telephone, to a set of text words in a document. This process can be used for numerous applications including transcription, data entry and word processing. The development of speech recognition technology is primarily focused on accurate speech recognition, which is a formidable task due to the wide variety of pronunciations, phrases, accents, and speech characteristics. In particular, previous attempts to transcribe phrases accurately have been met with limited success.

The key to speech recognition technology is the language model. Today's state of the art speech recognition tools utilize a factory (or out-of-the-box) language model, which is often customized to produce a site-specific language model. Further, site-specific users of speech recognition systems customize factory language models by including site-specific names and phrases. A site-specific language model might include, for example, the names of doctors, hospitals, or medical departments of a specific site using speech recognition technology. Unfortunately, factory language models include few names and phrases and previous attempts to provide phrase customization did not produce customized language models that accurately recognize phrases during speech recognition.

Previous efforts to solve this problem involved customizing a language model by adding phrases and corresponding phrase pronunciations to the language model. The phrase pronunciations for the added phrase were created as a combination of pronunciations of the components or elements of the phrase. As such, a phrase to be added to the language model would be initially broken down into components. For each component, the language model would be searched for a matching component and corresponding pronunciation. If all components were found in the language model, the corresponding pronunciations for each component of the phrase would be concatenated to form pronunciations of the new multi-word phrase. The new phrase was then added, together with its corresponding pronunciations, to the language model.

If any components were not found in the language model, a background dictionary was searched for the components. Any component tokens still not found in either the language model or the background dictionary were sent to a pronunciation guesser module, where component pronunciations were guessed based on their orthography (spelling). Phrase pronunciations were then formed for that phrase by combining all pronunciations from the language model, background dictionary, or guesser module. The new phrase was then added, together with its corresponding pronunciations, to the language model.

However, problems occur when phrase components are pronounced differently when part of a phrase. For example, the ampersand sign is pronounced as 'and' in a phrase but as 'ampersand' in the language model. Some previous systems attempted to solve this problem by adding additional pronunciations to problematic words instead of adding phrase pronunciations. Unfortunately, if "&" in the language model is given an additional pronunciation of 'and', then when an ordinary phrase such as "bacon and eggs" is dictated, it may be transcribed with an ampersand instead of an "and". Conversely, if "&" is not given an additional pronunciation of 'and', then when the phrase "Brigham & Women's Hospital" is added to the language model, it would receive the pronunciation 'Brigham ampersand women's hospital' in the language model. This is a problem because 'Brigham & Women's Hospital' is actually pronounced as 'Brigham and women's hospital.'

Additional problems occur when elements of a dictated phrase are not pronounced, that is, are silent. Previous systems failed to provide transcription for any silent or unspoken aspect of a phrase. For instance, a slash is used in many phrases but silent when pronounced. For example, "OB/GYN" is a phrase pronounced 'OBGYN'. However, under traditional systems, the slash would not be recognized or transcribed unless the dictator actually spoke 'slash', despite the fact that doctors and hospitals expect the transcribed text of a medical report to include the slash in "OB/GYN".

Another problem with silent elements of a phrase includes well-known formatting or terms of the trade that are shortened or abbreviated for convenience when spoken. For example, the phrase "WISC (Revised)" is a phrase that is dictated for convenience in the medical fields as 'WISC Revised', without specifically dictating the parentheses around 'Revised'. Traditional systems would require that the phrase in the language model have a pronunciation including the parentheses. This approach requires that the parentheses be awkwardly dictated in order for the automatic transcription to include the parentheses.

Additionally, traditional systems resulted in prohibitively large numbers of permutations of possible phrase pronunciations for many phrases. This is the result of each phrase component having multiple pronunciations in the language model. When combining the pronunciations from each phrase component, the number of possible combinations grows rapidly. Therefore, previous systems added a huge number of possible pronunciations for a long phrase where one or maybe two pronunciations would be sufficient for automatic recognition of a long phrase.

Previous systems also failed to identify context based pronunciations in a phrase. For example, the phrases "St. Mulbery" and "Mulbery St." contain the component 'St.' but the first phrase refers to a saint and the second phrase refers to a street. A typical language model includes both 'street' and 'saint' pronunciations for the component 'St.'. Therefore, in previous systems when the phrase "St. Mulbery" was added to the language model, the system would inefficiently provide both the 'saint Mulbery' and 'street Mulbery' pronunciations.

Therefore, there exists a need for a speech recognition technology that updates a language model with phrases that can be accurately recognized and transcribed.

SUMMARY OF THE INVENTION

The present invention includes a system and method for a speech recognition technology that allows language models to be customized through the addition phrase pronunciations through the use of special pronunciations for components of phrases. The steps of the method may include generating a list of pron components, whose pronunciations differ when they occur in a phrase and assigning at least one pron to each pron component. The steps may also include determining the pronunciation of a phrase, by tokenizing the phrase by generating a list of tokens corresponding to the phrase. Determining the phrase pronunciation may include determining a pron for each of the list of tokens and assembling the pronunciation of the phrase based upon a combination each pron. Finally, the system may add the phrase and the pronunciation of the phrase to the language model.

Another aspect of the present invention may include identifying initial and non-initial tokens of a phrase. The present invention may include generating a phonetic transcription for each pron component based on a literal phonetic transcription or referencing a phonetic transcription from the language model.

Another aspect of the present invention may include determining a pron for each token by searching a pron component list. The pron component list may include both an initial pron component list and a non-initial pron component list.

Another aspect of the present invention may include searching the language model and/or the background dictionary for a pron. The present invention may also include a pron guesser for guessing the pron for a token.

In another aspect, the present invention includes a system for adding phrase pronunciations to a language model including a computer with a computer code mechanism for processing a list of pron components whose pronunciations differ when they occur in a phrase, assigning at least one pron to each pron component, determining the pronunciation of a first phrase by first tokenizing the first phrase by generating a list of tokens corresponding to the first phrase, then determining a pron for each of the list of tokens, then assembling the pronunciation of the first phrase based on a combination of each pron, and adding the first phrase and the pronunciation of the first phrase to a language model; a language model electronically accessible by the computer code mechanism; and a tokenizer for generating a list of tokens corresponding to the first phrase, the tokenizer being in electronic communication with the computer code mechanism. In some embodiments the pron components list includes non-initial components. In some embodiments, the pron components list includes initial components.

In still another embodiment the system includes a background dictionary electronically accessible by the computer code mechanism, wherein the computer code mechanism searches the background dictionary to determine a pron for each token.

In another embodiment the system includes a pron guesser in electronic communication with the computer code mechanism, wherein the computer code mechanism applies the pron guesser to determine a pron for each token.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION

The present disclosure will now be described more fully with reference to the Figures in which an embodiment of the present disclosure is shown. The subject matter of this disclosure may, however, be embodied in many different forms and should not be construed as being limited to the embodiments set forth herein.

Figure 1:
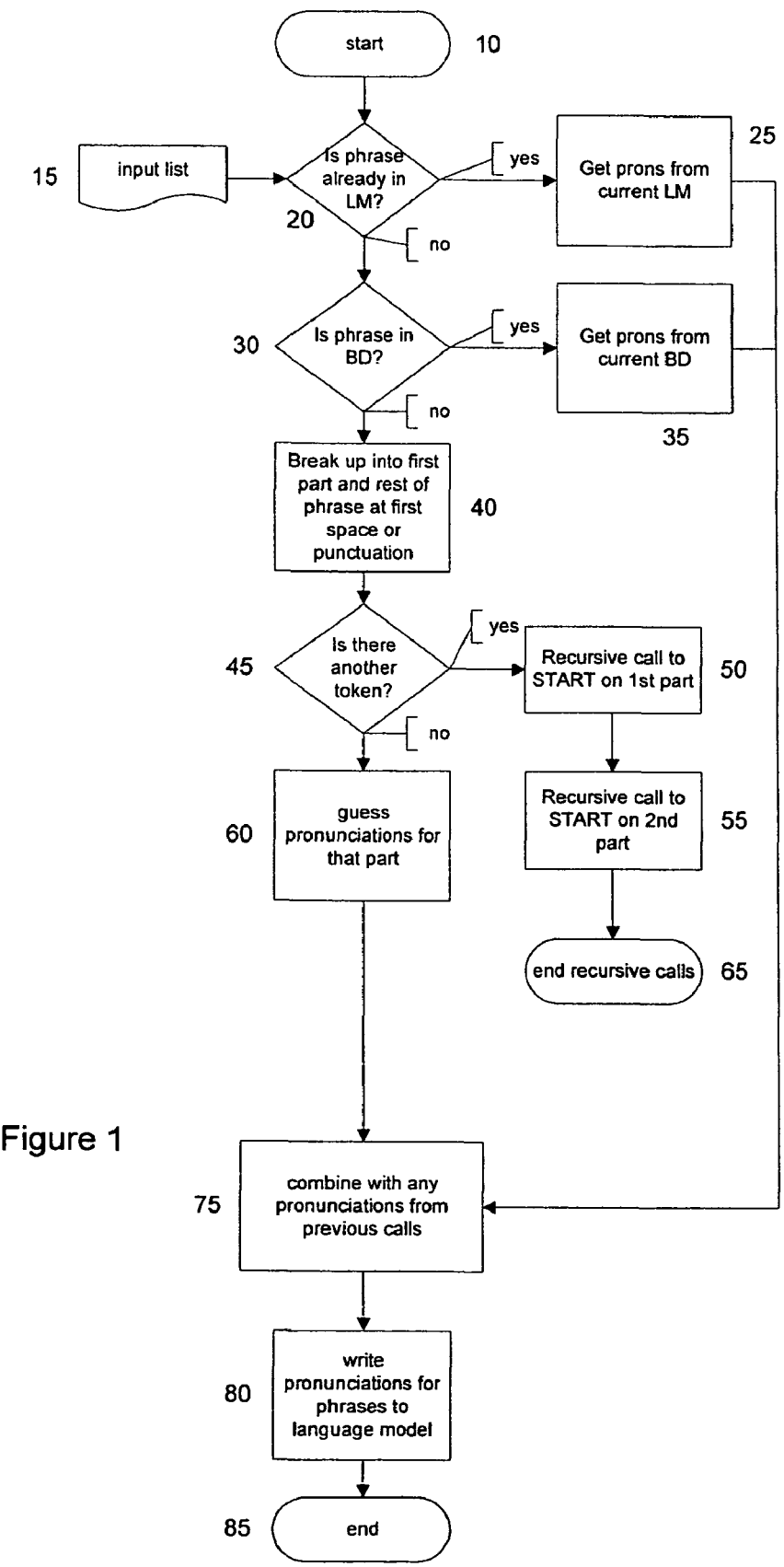
FIG. 1 shows an architecture view of the system and method for modifying a language model in accordance with prior art.

Referring to FIG. 1, an architecture view shows a previously known system or method for the creation of a multiword phrase pronunciation and for the modification of a language model in accordance with the prior art. The method begins with step 10 initializing the steps of the system.

A list of phrases to be added to the language model is fed into the system in step 15. Each phrase from the input list is presented to the system in step 20, and proceeds all the way thru to the end at step 85, at which point the pronunciations created for each phrase are added to the language model. The system is repeated for each phrase in the input list until we have added pronunciations for all the phrases to the language model.

In step 20, a phrase is compared against the language model to determine if the phrase already exists in the language model. If so, the pronunciation or pronunciations associated with the phrase are collected from the language model in step 25 and provided to step 75.

If the phrase is not located in the language model in step 20, the background dictionary is searched in step 30. If a match to the phrase is found in the background dictionary, the pronunciation or pronunciations associated with the phrase are collected from the background dictionary in step 35 and provided to step 75.

It should be noted that words in the language model may have multiple pronunciations associated with a given word or phrase. Likewise, words in the background dictionary may also have multiple pronunciations associated with a given word or phrase. Therefore, if a word or phrase is located in the language model or background dictionary, multiple pronunciations may be provided to step 75 or a given phrase or component of a phrase.

If the phrase is not found in either the language model or the background dictionary, the phrase is broken into smaller parts or phrasal components if possible. Step 40 determines if the phrase can be parsed into a first component and a second component at the first space or punctuation mark. Step 45 determines if the phrase includes more that one part and if so, step 50 begins a recursive loop on the first part or component of the phrase.

Step 50 sends the first component back to step 20 to initiate the loop on the first component. Step 20 determines if the first component exists in the language model. If a matching component is found in the language model, then the pronunciation of the first component is retrieved from the language model and delivered to step 75.

If a match is not found in the language model, then step 30 determines if the first component is in the background dictionary in step 30. If the first component is found in the background dictionary, then its pronunciation is retrieved from the background dictionary and delivered to step 75.

If a match is not found in either the language model or the background dictionary, then step 40 determines if the first component may be broken down any further into smaller components. As the first component was removed from the phrase on the initial pass through the system, the first component cannot be broken into smaller parts and therefore step 45 will determine that there is no more than one part of the first component.

When any phrasal component passing through the system cannot be broken into smaller parts and cannot be matched in either the language model or the background dictionary, the pronunciation of the phrasal component will be guessed in step 60. It should be noted that the pronunciation guesser in step 60 may guess multiple pronunciations and that those pronunciations will be passed forward to step 75.

Once pronunciations for the first component are delivered to step 75 from the language model, the background dictionary, or the pronunciation guesser, the recursive loop of step 50 is finished and the recursive loop on the second part of the phrase in step 55 is sent to step 20.

The second part passed through steps 20, 25, 30, and 35 as described above. If a pronunciation is found for the second part, then the pronunciation or pronunciations are delivered to step 75. However, if no pronunciations are found, then the second part is analyzed in step 40 to determine if the second part of the phrase contains smaller components that can be individually passed through the system as the first component.

If the second part does not contain any smaller components and no match for the second part is found in either the language model or the background dictionary, then step 60 guesses the pronunciation of the second part. The guessed pronunciations are delivered to step 75. Step 75 combines the pronunciations from each phrasal component. Step 80 writes the phrase and the pronunciations to the language model and step 85 ends the system.

If the second part does contain multiple parts, then step 45 will determine that there is more than one part and proceed to step 50 where the first component of the second part will be sent to step 20. The recursive loops of steps 50 and 55 will repeat the above described steps with respect to FIG. 1, specifically repeating the recursive loop steps 50, 55 and 65 until each individual phrasal component is identified and corresponding pronunciations assigned and delivered to step 75.

When all the components or parts have corresponding pronunciations assigned and delivered to step 75, the pronunciations are combined. The pronunciations from the top level call and all recursive calls are combined in step 75 and added to the language model in step 80 to be used by subsequent passes through the system. Once the phrase and corresponding pronunciations are written to the language model in step 80, the system is ended in step 85.

It should be noted that when the pronunciations are combined in step 75, the number of phrase pronunciations could multiply very quickly if each component or part is associated with multiple corresponding pronunciations. Therefore, the number of permutations of possible phrase pronunciations to be written to the language model may be prohibitively large for a long multi-part phrase with multiple pronunciations for each part of the phrase.

Figure 2:
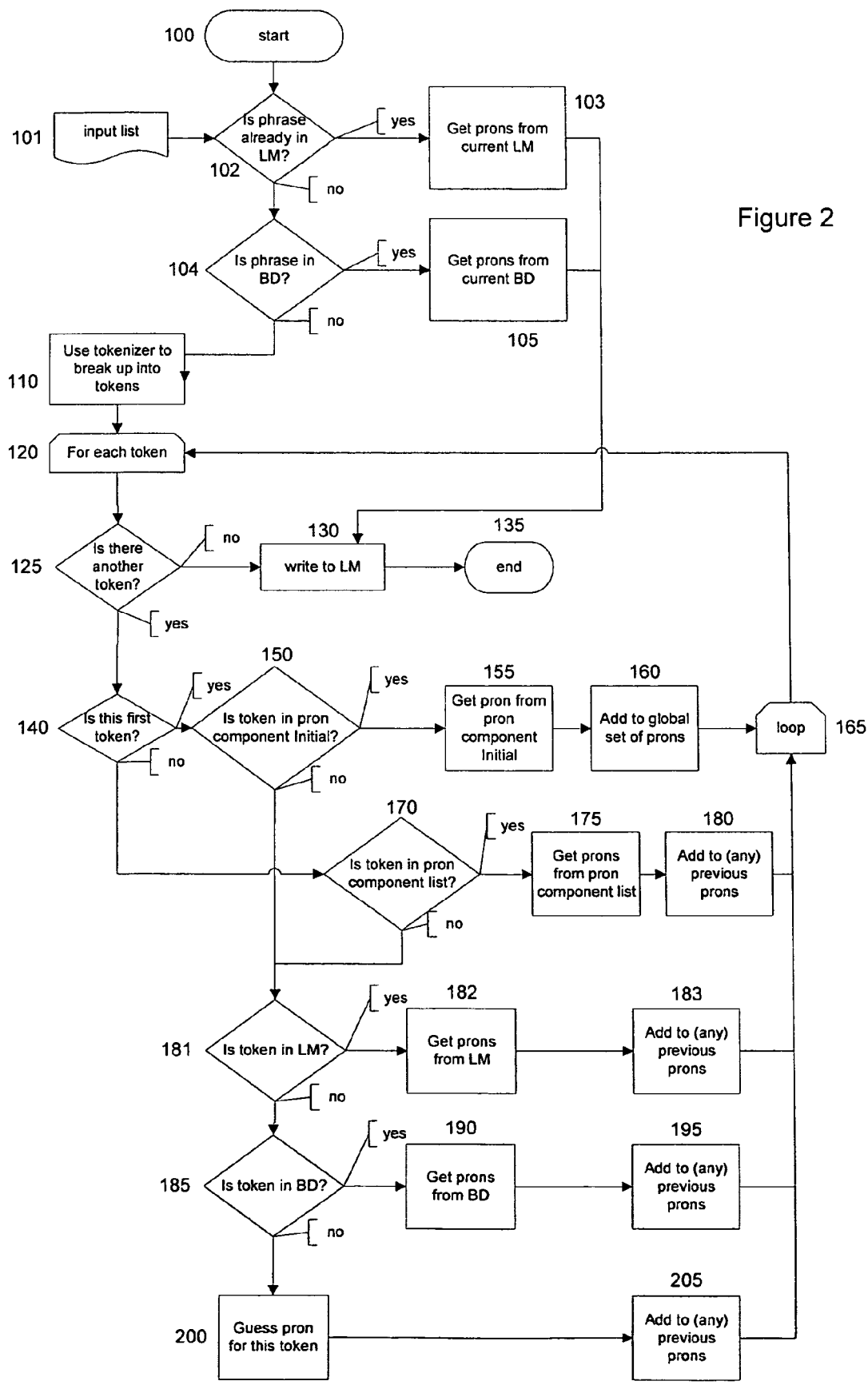
FIG. 2 shows an architecture view of the system and method for modifying a language model in accordance with certain teachings of the present disclosure.

Referring to FIG. 2, an architecture view shows a system or method for the creation of a multiword phrase pronunciation and for the modification of a language model in accordance with an embodiment of the present invention. The method begins with step 100 initializing the steps.

As with the system shown in FIG. 1, an input list of phrases to be added to the language model is provided to the system in step 101. It should be noted that the phrases may be entered on an individual basis or entered as a group, sequentially passing through the system.

Each phrase from the input list is presented to the system in step 102, and proceeds through the system to the end at step 135, at which point the pronunciations for each phrase are written to the language model. The process is repeated for each phrase in the input list until we have added pronunciations to the language model for every phrase in the input list.

In step 102, a phrase is compared against the language model to determine if the phrase already exists in the language model. If so, the pronunciation or pronunciations associated with the phrase are collected from the language model in step 103 and provided to step 130.

If the phrase is not located in the language model in step 102, the background dictionary is searched in step 104. If a match to the phrase is found in the background dictionary, the pronunciation or pronunciations associated with the phrase are collected from the background dictionary in step 105 and provided to step 130.

If the phrase is not found in either the language model or the background dictionary, a tokenizer breaks up the phrase into phrasal components or 'tokens' in step 110. These tokens are delivered to step 120, where a loop begins that sequentially processes each token of the phrase.

It should be noted that the tokenizer parses a phrase according to certain rules. Primarily, the tokenizer breaks up a phrase into phrasal elements or tokens at certain boundaries, looking for the longest match in the language model or background dictionary. For instance, the phrase "ham & eggs" has 3 phrasal elements and the tokenizer would break the phrase up into three tokens: "ham," "&," and "eggs." However, the phrase "San Francisco Chronicle" contains two phrasal elements: "San Francisco" and "Chronicle." The element "San Francisco" is one element because a match exists in the language model for "San Francisco." The tokenizer may also parse a phrase simply by white space or punctuation.

Step 120 controls the system looping the tokens from the tokenizer. Each token is provided in turn to step 125. Step 125 determines if additional tokens have not passed through the system. If a token has not passed through the system, the token is delivered to step 140. If every token has passed through the system, step 125 would direct the system to step 130.

For each token, a pron component list is searched for a match. The pron component list includes pron components or tokens that are pronounced differently when part of a phrase. The pron component list includes these tokens and corresponding pronunciations. The corresponding pronunciations in the pron component list, language model, and background dictionary are referred to as prons. The prons located in the pron component list are the pronunciations of how tokens are pronounced in a phrase. For example, the token "&" would have a pron of 'and' in the pron component list but a pronunciation of 'ampersand' in the language model.

The pron component list may also include components that are not pronounced differently but require fewer pronunciations to be recognized by a speech recognition system when part of a phrase. For example, "and" only needs one, maybe two, pronunciations to be recognized as part of a phrase as opposed to the many more pronunciations that are typically found in a language model for the token 'and'. Therefore, the token 'and' may be present in the pron component list with only one pron of 'and'. The pron component list may also include punctuations or formatting that is present in the text of the phrase but is silent in the spoken phrase. In this situation, if the phrase 'OB/GYN' was a phrase to be added to the language model, the token '/' would have a silent pron.

It should be noted that prons may be specified in the pron component list as literal phonetic transcriptions of their corresponding tokens, or prons may referenced their corresponding tokens in the language model, where the phonetic transcription is looked up by referencing that token in the language model.

To provide additional recognition accuracy, an initial pron component list may be searched for a match to the first token of every phrase. This initial pron component list may be used to identify the unique pronunciations of tokens when they occur at the start of a phrase. Therefore, the pron component list and the initial pron component list may be substantially identical except for those tokens that have different prons when they occur at the start of a phrase. For example, 'St.' is a token that changes prons depending on whether the token occurs at the start of the phrase. 'St.' has a pron of 'saint' when it occurs at the start of a phrase and 'street' or 'saint' when it occurs elsewhere in a phrase.

The embodiment of FIG. 2 utilizes an initial pron component list. However, the system shown in FIG. 2 might also be accomplished with only a pron component list and remain within the scope of the invention. Therefore in FIG. 2, step 140 determines if the token passing through the loop is the first token in the phrase. If so, then the first token is delivered to step 150 where a list of initial pronunciation components or 'pron' components may be searched to determine if the first token is in the initial pron component list. If a match to the first token is found, then the corresponding initial pron component is retrieved from the initial pron component list in step 155 and added to a global set of prons being collected for each of the tokens in the phrase in step 160.

If the first token of the phrase is not located in the initial pron component list, then the first token is delivered to step 181. Step 181 determines if the first token is in the language model and if so, retrieves the pronunciations from the language model in step 182. Step 183 adds the pronunciations to the global set or prons being collected for each of the tokens in the phrase.

If the first token is not located in the language model, then the first token is delivered to step 185. Step 185 determines if the first token is in the background dictionary and if so, retrieves the pronunciations from the background dictionary in step 190. Step 195 adds the pronunciations to the global set or prons being collected for each of the tokens in the phrase.

If a match is not found in the initial pron component list or the language model or the background dictionary, then step 200 guesses the pronunciation for the first token. Step 205 adds the guessed pronunciation to the global set of prons being collected for each of the tokens in the phrase.

Once the first token is assigned a pronunciation by the system, steps 165 and 120 return the system to step 125 where the second token proceeds through the system. Step 140 determines that second token should proceed to step 170, which determines if the second token is present in the pron component list. If a match of the second token is found in the pron component list, then the corresponding pron is retrieved from the pron component list in step 175 and added to the global set of prons being collected for each of the tokens in the phrase in step 180.

If the second token is not located in the pron component list, then the second token is delivered to step 181. Step 181 determines if the second token is in the language model and if so, retrieves the pronunciation from the language model in step 182. Step 183 adds the pronunciation to the global set of prons being collected for each of the tokens in the phrase.

If the second token is not located in the language model, then the token is delivered to step 185. Step 185 determines if the token is in the background dictionary and if so, retrieves the pronunciation from the background dictionary in step 190. Step 195 adds the pronunciation to the global set of prons being collected for each of the tokens in the phrase.

If a match is not found in the pron component list or the language model or the background dictionary, then step 200 guesses the pronunciation for the second token. Step 205 adds the guessed pronunciation to the global set of prons being collected for each of the tokens in the phrase.

Once the second token is assigned a pronunciation by the system, steps 165 and 120 return the loop to step 125. Step 125 determines whether there are additional tokens in the phrase that have not passed through the system shown in FIG. 2. It should be noted that each additional token of the phrase passes through the system in the same manner as described above with respect to the second token. It should also be noted that the system may perform as many loops as necessary to process every token in the phrase and compile a pronunciation for every token in the phrase. For example, a phrase with four tokens will make four loops through the system and a phrase with ten tokens will make ten loops through the system.

It should be noted that as prons are added to the global set of prons being collected for each token of the phrase, the pronunciation for the phrase is combined token by token. Once every token is assigned a corresponding pronunciation, a pronunciation for the entire phrase is created from the combined pronunciations, and there are no additional tokens to be processed, step 125 will indicate that the system is finished and deliver the phrase and corresponding phrase pronunciations to Step 130. Step 130 will then write the phrase and the corresponding phrase pronunciation to the language model for use during automatic speech recognition. After the language model is updated, the system ends with step 135.

It should be noted that after a phrase and corresponding phrase pronunciations are written to the language model, the next phrase from the input list is processed from step 102 to step 135. Multiple phrases may be processed and automatically assigned pronunciations until each phrase in the input list is assigned pronunciations and written in the language model. Thus, phrases may be individually added to the language model as described above with reference to FIG. 2 or multiple phrases may be added to the language model at one time by repeating the step 102 through step 135 for each phrase in the input list.

A computer system for implementing the methods described above will now be described. Such a computer system has a computer with a computer code mechanism capable of processing a list of pron components whose pronunciations differ when they occur in a phrase. The computer code mechanism assigns at least one pron to each pron component. The computer code mechanism then determines the pronunciation of a phrase by providing the phrase to a tokenizer in electronic communication with the computer code mechanism. The computer code mechanism then determines a pron for each of the list of tokens provided by the tokenizer and assembles the pronunciation of the phrase based on a combination of each of the prons. The computer code mechanism then adds the phrase and the pronunciation of the phrase to a language model electronically accessible by the computer code mechanism.

Optionally, the computer code mechanism may be capable of generate a phonetic transcription for each pron component when assigning a pron to each pron component. In generating a phonetic transcription, the computer code mechanism optionally may reference an item in the language model. The computer code mechanism optionally may specify a literal phonetic transcription when generating a phonetic transcription.

Optionally, the computer code mechanism may also be capable of processing a pron component list containing initial or non-initial components.

The computer system also includes a language model electronically accessible by the computer code mechanism. After the computer code mechanism completes determining the pronunciation of a phrase, the computer code mechanism adds the phrase and its pronunciation to the language model. Optionally, the language model may be capable of being referenced by the computer code mechanism when the computer code mechanism generates a phonetic transcription. The language model optionally may be capable of being searched by the computer code mechanism in order to determine a pron.

The computer system further includes a tokenizer. The tokenizer is in electronic communication with the computer code mechanism and generates a list of tokens corresponding to a phrase provided by the computer code mechanism. The tokenizer then provides the list of tokens to the computer code mechanism. The tokenizer may also identify an initial or a non-initial token.

Optionally, the computer system may include a background dictionary electronically accessible by the computer code mechanism. If such a background dictionary is available, it may be searched by the computer code mechanism in order to determine a pron.

Optionally, the computer system may further include a pron guesser. The pron guesser, if present, is in electronic communication with the computer code mechanism and is capable of being applied to a token in order to determine a pron.

It will be apparent to one of skill in the art that described herein is a novel system and method for modifying a language model. While the invention has been described with reference to specific embodiments, it is not limited to these embodiments. The invention may be modified or varied in many ways and such modifications and variations as would be obvious to one of skill in the art are within the scope and spirit of the invention and are included within the scope of the following claims.

The invention claimed is:

1. A method in a computer system for adding phrase pronunciations to a language model, the method comprising steps of:
   receiving at least one phrase to be added to the language model, the at least one phrase comprising a first phrase, the first phrase comprising a plurality of tokens including a first token;
   generating, using the computer system, a phrase pronunciation for the first phrase comprising a token pronunciation for the first token in the first phrase, wherein generating the phrase pronunciation for the first phrase comprises determining if the first token is represented in a pron component list, and, if so, selecting as the token pronunciation for the first token in the first phrase a component pronunciation from the pron component list, wherein the pron component list comprises a list of one or more component pronunciations for at least the first token as pronounced in one or more phrases, wherein the list of one or more component pronunciations is different from any list of one or more language model pronunciations in the language model for the first token; and
   adding the phrase pronunciation for the first phrase to the language model;
   wherein the step of generating the phrase pronunciation for the first phrase further comprises;
      if the first token is not represented in the pron component list, determining if the first token is represented in the language model, and, if so, selecting a language model pronunciation from the language model as the token pronunciation for the first token in the first phrase.

2. A method for adding phrase pronunciations to a language model, in accordance with claim 1, wherein the pron component list includes punctuation and/or formatting that is present in the first phrase but is silent in the phrase pronunciation for the first phrase.

3. A method for adding phrase pronunciations to a language model, in accordance with claim 1, wherein the pron component list is selected from a plurality of lists in accordance with the position of the first token within the first phrase.

4. A method for adding phrase pronunciations to a language model, in accordance with claim 1, wherein the first token is parsed from the first phrase based on word boundaries.

5. A method for adding phrase pronunciations to a language model, in accordance with claim 4, wherein the word boundaries comprise white spaces and/or punctuation.

6. A method for adding phrase pronunciations to a language model, in accordance with claim 1, wherein the first token is parsed from the first phrase by looking for the longest match in the language model or a background dictionary.

7. A method for adding phrase pronunciations to a language model, in accordance with claim 1, wherein the pron component list is one of an initial pron component list or a non-initial pron component list.

8. The method of claim 1, wherein the list of one or more component pronunciations is different from any list of one or more language model pronunciations in the language model for the first token in that a list of one or more language model pronunciations for the first token includes a pronunciation that is not included in the list of one or more component pronunciations for the first token.

9. The method of claim 1, wherein the list of one or more component pronunciations is different from any list of one or more language model pronunciations in the language model for the first token in that the list of one or more component pronunciations for the first token includes a pronunciation that is not included in any list of one or more language model pronunciations for the first token.

10. A computer system comprising:
    a tokenizer that parses a phrase to be added to a language model into a plurality of tokens including a first token; and
    a computer code mechanism that:
        generates a phrase pronunciation for the phrase comprising a token pronunciation for the first token in the phrase, wherein generating the phrase pronunciation for the phrase comprises determining if the first token is represented in a pron component list, and, if so, selecting as the token pronunciation for the first token in the phrase a component pronunciation from the pron component list, wherein the pron component list comprises a list of one or more component pronunciations for at least the first token as pronounced in one or more phrases, wherein the list of one or more component pronunciations is different from any list of one or more language model pronunciations in the language model for the first token; and
        adds the phrase pronunciation for the phrase to the language model;
    wherein the computer code mechanism generates the phrase pronunciation for the phrase at least in party by, if the first token is not represented in the pron component list, determining if the first token is represented in the language model, and, if so, selecting a language model pronunciation from the language model as the token pronunciation for the first token in the phrase; and
    wherein the tokenizer and/or the computer code mechanism is implemented by a computer.

11. The computer system of claim 10, wherein the pron component list includes punctuation and/or formatting that is present in the phrase but is silent in the phrase pronunciation for the phrase.

12. The computer system of claim 10, wherein the computer code mechanism selects the pron component list from a plurality of lists in accordance with the position of the first token within the phrase.

13. The computer system of claim 10, wherein the tokenizer parses the first token from the phrase based on word boundaries.

14. The computer system of claim 13, wherein the word boundaries comprise white spaces and/or punctuation.

15. The computer system of claim 10, wherein the tokenizer parses the first token from the phrase by looking for the longest match in the language model or a background dictionary.

16. The computer system of claim 10, wherein the pron component list is one of an initial pron component list or a non-initial pron component list.

17. The computer system of claim 10, wherein the list of one or more component pronunciations is different from any list of one or more language model pronunciations in the language model for the first token in that a list of one or more language model pronunciations for the first token includes a pronunciation that is not included in the list of one or more component pronunciations for the first token.

18. The computer system of claim 10, wherein the list of one or more component pronunciations is different from any list of one or more language model pronunciations in the language model for the first token in that the list of one or more component pronunciations for the first token includes a pronunciation that is not included in any list of one or more language model pronunciations for the first token.

* * * * *

UNITED STATES PATENT AND TRADEMARK OFFICE
CERTIFICATE OF CORRECTION

PATENT NO. : 7,783,474 B2  Page 1 of 1
APPLICATION NO. : 11/069203
DATED : August 24, 2010
INVENTOR(S) : William F. Cote et al.

It is certified that error appears in the above-identified patent and that said Letters Patent is hereby corrected as shown below:

In the claims:

Claim 1 at column 10, line 56, change ";" to ":"

Claim 10 at column 12, line 7, change "party" to "part"

Signed and Sealed this

Second Day of November, 2010

David J. Kappos
*Director of the United States Patent and Trademark Office*